United States Patent [19]

Tosseghini

[11] Patent Number: 4,582,082

[45] Date of Patent: Apr. 15, 1986

[54] PISTON-DRIVEN VALVES

[75] Inventor: Hugo Tosseghini, Conflans-Ste-Honorine, France

[73] Assignee: Joucomatic S.A., Rueil-Malmaison, France

[21] Appl. No.: 689,901

[22] Filed: Jan. 9, 1985

[30] Foreign Application Priority Data

Jan. 9, 1984 [FR] France .................................. 84 00208

[51] Int. Cl.$^4$ .......................................... F16K 31/122
[52] U.S. Cl. ......................................... 137/270; 92/59; 251/63; 251/63.5
[58] Field of Search ............. 137/270; 92/59; 251/62, 251/63.5, 63.6, 63

[56] References Cited

U.S. PATENT DOCUMENTS 2,421,325  5/1947  Griswold .......................... 137/115 X
2,625,954  1/1953  Klein ........................... 137/505.42 X
2,697,599 12/1954  Vandal ............................. 137/270 X Primary Examiner—Alan Cohan
Attorney, Agent, or Firm—Wenderoth, Lind & Ponack

[57] ABSTRACT

A piston-driven valve includes a valve body provided with inlet and outlet openings, the communication between which may be interrupted by a clack-valve which is integral with a rod connected to a piston which is subjected to a valve-control pressure. A reversible head is equipped with an intake port for the control pressure, and the piston is located in the reversible head. A first reset spring named low pressure spring, directly bears on the piston, and a second reset spring is located between two calibrating bridges and selectively acts on the piston structure is provided for removing action by the second spring on the piston, in order to allow the valve to work with a low control pressure value.

4 Claims, 5 Drawing Figures

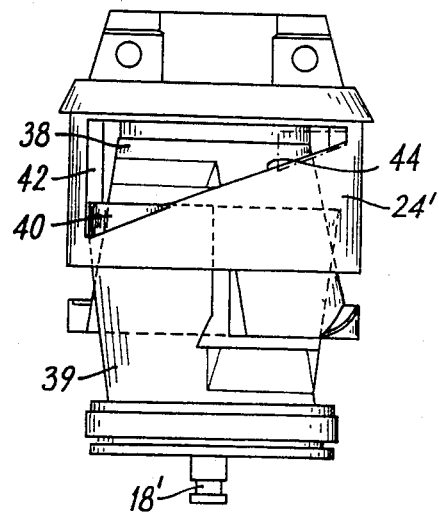
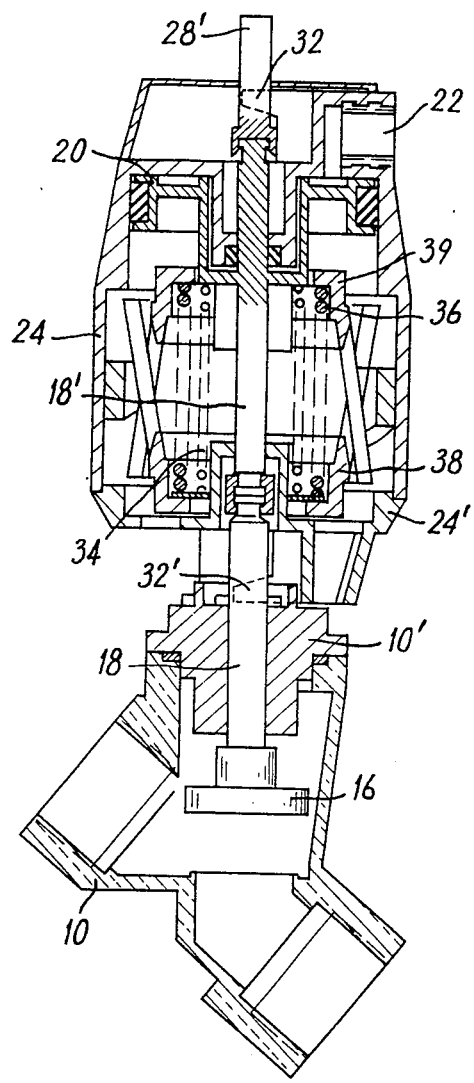
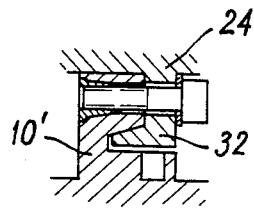

PISTON-DRIVEN VALVES

BACKGROUND OF THE INVENTION

This invention relates to improvements in piston-driven valves. It is known that such valve units include a valve body equipped with inlet and outlet openings the communications between which may be interrupted by a clack-valve which is integral with a rod connected to a piston which is subjected to a valve control pressure. Such valves chiefly are of two types:

(a) "normally closed" valves, where the driving piston, when at rest and subjected the action of a spring, applies the clack-valve on a valve seat, so that the valve opens only when a control pressure acts against the spring;

(b) "normally open" valves, where the driving piston, when at rest and subjected to the action of a spring, keeps the clack-valve away from the valve seat, so that the valve closes only when the control pressure acts against the spring.

There are also piston-driven valves which are either normally open or normally closed, working under either normal or low pressure. Thus, the operator must have at his disposal a relatively high number of valves for the various applications contemplated.

SUMMARY OF THE INVENTION

Thus, the object of the invention is to provide a piston-driven valve which may operate according to either the normally closed mode or to the normally open mode, and with either normal or low pressure values.

The invention provides a piston-driven valve unit including a reversible head equipped with an intake port for the control pressure, a driving piston, located in the head and to which a clack-valve is connected, a first, low pressure reset spring directly bearing on said driving piston, a second high pressure reset spring positioned between two calibrating bridges and selectively operate to act on the driving piston, and means for removing the action exerted by the second reset spring on the driving piston.

Due to the reversible head, the control pressure may be allowed to exert its action under the driving piston, thereby securing a normally closed working mode, or over the driving piston, thereby securing a normally open working mode, as explained hereafter. On the other hand, the second reset spring secures a working mode under normal control pressure, and removing the action of said second reset spring allows a working mode under low control pressure.

According to the invention, one of the calibrating bridges is movable with respect to the other, so that it is possible to move it away from the driving piston in order to remove the action of the second reset spring on the piston and to allow a working mode under low control pressure. To this end, the movable calibrating bridge includes lugs which slide along sloping ramps or surfaces provided in a part of the body forming a rotatable selecting cap, during rotation of the latter, thereby moving the movable calibrating bridge away from the driving piston.

BRIEF DESCRIPTION OF THE DRAWINGS

Other characteristic features and advantages of this invention will become more readily apparent from the following description and from the accompanying drawings illustrating non-limiting embodiment wherein:

FIG. 3 is a partial elevation view showing the location and arrangement of a calibrating bride in a body of the valve unit;

FIG. 4 is a view similar to FIGS. 1 and 2, but showing the valve unit in a "normally open" working mode; and FIG. 5 is a detailed vertical section showing a fastening device of a stuffing box for the valve body.

DETAILED DESCRIPTION OF THE INVENTION

Figure 1:
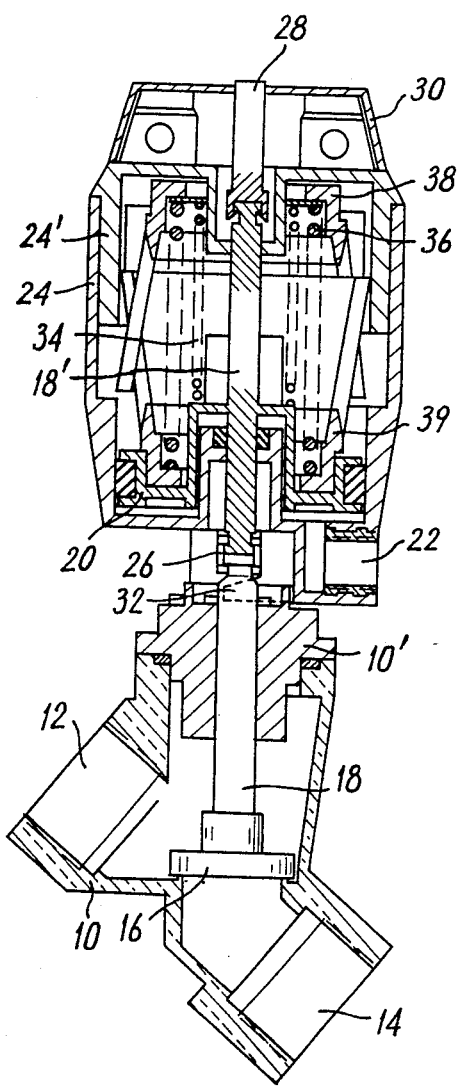
FIG. 1 is a longitudinal section of a valve unit according to the invention, illustrates a "normally closed" and normal pressure working mode.

Referring to the drawings, it may be seen that a valve unit according to the invention comprises a valve body 10 provided with two openings 12, 14, the communication between which may be interrupted by a clack-valve 16, a rod 18 of which is integral with a driving piston 20, subjected to the action of a reset spring and of a control pressure which is introduced through a control opening 22 formed in a head 24 of the valve.

Figure 2:
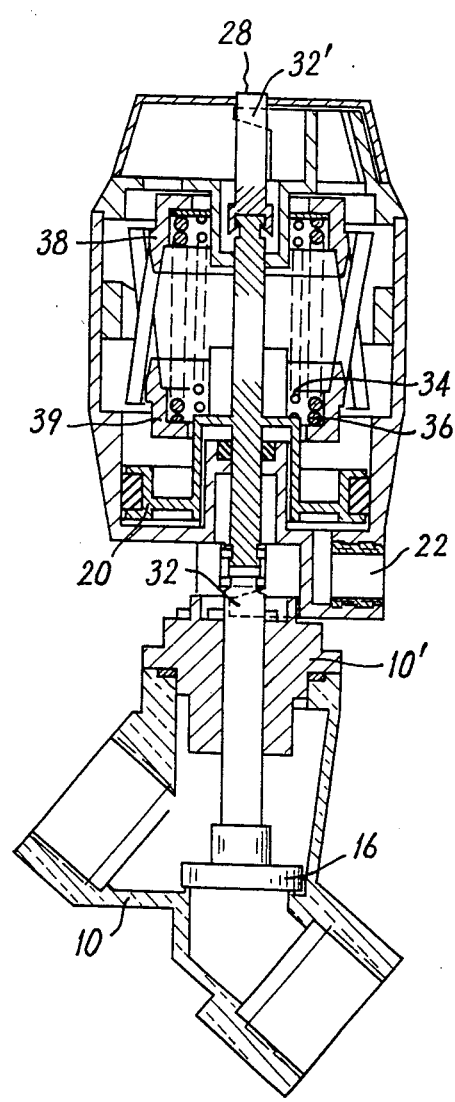
FIG. 2 is a view similar to FIG. 1, but showing the valve unit in a "normally closed" and low pressure working mode.

According to the invention, the head 24 is reversible (FIGS. 1 and 2 show the head in one position, and FIG. 4 shows the head in a different position), and through this head streches a rod 18' on the lower end of which the rod 18 of the clack-valve 16 is mounted through a coupling sleeve 26. On the other end of the rod 18', is fixed an optical device 28 for indicating the position of the clack-valve 16.

The head 24, the upper part of which is protected by a bonnet or cap 30, includes means 32, 32' which are located in the upper and lower parts of the head and ensure its attachment to the body 10. FIG. 5 shows how the head 24 is fixed to a stuffing box 10' of the body 10, through the fixing part 32.

The reversible head 24 includes a first, low pressure reset spring 34 which directly bears on the driving piston 20, and a second, high pressure reset spring 36 which is placed between two calibrating bridges or spring support members 38 and 39, the arrangement being made in such a way that the calibrating bridge 39 may rest on the driving piston 20 under the action of the spring 36 (the position represented on FIG. 1), or may be kept in a position separated from the piston 20 (FIG. 2). To this end (FIG. 3), the calibrating bridge 39 is movable in the head 24 and has pins 40 which slide along sloping surfaces 44 of ports 42 made in the upper part or selecting cap 24' of the head 24. It is easy to understand that rotation of selecting cap 24' causes the pins 40 of the calibrating bridge 39 to slide along the ramps 44, so that the calibrating bridge moves to a raised position (FIG. 2) whereat the piston 20 no longer is subjected to the action of the spring 36 which bears on the calibrating bridge 39.

The following description concerns the various working modes of the valve according to the invention:

(1) Working according to the "normally closed" mode, with normal or high control pressure, i.e. when both reset springs are in action (FIG. 1):

In this working mode, the calibrating bridge 39 occupies the position indicated on FIG. 1 (low position) and bears on the driving piston 20 which, therefore, is submitted to the action of both reset springs 34 and 36. At rest, the clack-valve is closed under the action exerted by both springs on the piston 20. When the control pressure is admitted through the opening 22, the driving piston 20 and the calibrating bridge 39 are raised against the action of the reset springs 34 and 36, so that the clack-valve 16 opens. As soon as the supply of the control pressure closes, the springs reset the driving piston into the position where the clack-valve is closed;

(2) Working according to the "normally closed" mode, with low control pressure (FIG. 2):

In this working mode, only one reset spring, i.e. the low pressure spring 34, acts on the piston 20. In order to remove action by the high pressure spring 36, the operator rotates the selecting cap 24' (FIG. 3). As mentioned above, this rotation causes an upward movement of the head of the calibrating bridge 39, which no longer bears on the driving piston 20. As a result, merely the spring 34 acts on the piston.

At rest, i.e. in the absence of any control pressure, the valve is normally closed, the clack-valve 16 being applied on its valve seat under the action of the reset spring 34. When a low control pressure is admitted through the opening 22, this pressure pushes the driving piston against the action of the spring 34, and the clack-valve opens. As soon as the supply of the control pressure ceases, the clack valve 16 is closed again due to the action of the reset spring 34.

It will be noticed that the optical indicator 28 makes it possible to determine the working mode (open or closed) of the clack-valve 16;

(3) Working according to the "normally open" mode (FIG. 4):

For this working mode, the reversible head 24 must be turned with respect to the position it occupies according to the normally closed working mode (FIGS. 1 and 2), so that the control pressure is supplied over the driving piston 20. Thus, the operator places the head in the position indicated by FIG. 4, the head being held on the stuffing-box 10' of the valve body 10 by the fastening means 32'.

At rest, in the absence of any control pressure, the clack-valve 16 is open because the driving piston is biased upwards under the action of the reset spring 34, which is possibly reinforced by the action of the spring 36, as explained above. When the control pressure is admitted through opening 22 (this pressure may be a normal pressure, if both springs 34 and 36 act on the driving piston, or a low pressure if the spring 34 acts, which corresponds to the case of FIG. 4), the driving piston 20 is pushed downwards, and the clack-valve 16 closes. As soon as the supply of the control pressure ceases, the clack-valve opens under the action of the reset spring 34, and possibly also of the spring 36. In such case, also the working mode of the valve may be determined by the indicator 28', which is integral with the piston rod 18'.

The above description shows that the invention provides an improved valve which make it possible to solve, by using a minimal number of parts, a great number of application problems.

What I claim is:

1. In a piston driven valve of the type including a valve body provided with inlet and outlet openings, communicating between which may be interrupted by a valve including a valve member which is integral with a rod which is connected to a piston which is subjected to a control pressure, the improvement comprising:

a reversible head having opposite ends, said piston being mounted in said head;

first, low pressure reset spring means directly acting on said piston for moving said piston, and thereby said valve, in a first direction toward a first said end of said head;

second, high pressure reset spring means, positioned between two spring support members, for selectively acting on said piston for moving said piston, and thereby said valve, in said first direction, thus providing a high pressure resistance to movement of said piston in a second direction toward said second end of said head;

means for selectively removing the action of said second spring means on said piston, thus providing a low pressure resistance to movement of said piston in said second direction;

said head having therein a control opening for the selective supply of a control pressure medium for moving said piston in said second direction against the force of said first or second spring means; and fastening means at said first and second ends of said head for selectively mounting said head on said valve body in one of a normally closed operating position, whereat said first end of said head is connected to said valve body and said spring means urge said piston to normally close said valve, and a normally open operating position, whereat said second end of said head is connected to said valve body and said spring means urge said piston to normally open said valve.

2. The improvement claimed in claim 1, further comprising optical indicator means, connected to said rod, for providing a visual indication of whether said second spring means is acting on said piston.

3. In a piston driven valve of the type including a valve body provided with inlet and outlet openings, communication between which may be interrupted by a valve including a valve member which is integral with a rod which is connected to a piston which is subjected to a control pressure, the improvement comprising:

a reversible head having opposite ends, said piston being mounted in said head;

first, low pressure reset spring means directly acting on said piston for moving said piston, and thereby said valve, in a first direction toward a first said end of said head;

first and second spring support means mounted within said head, said first spring support member being movable with respect to said second spring support member between a first position abutting said piston and a second position spaced from said piston;

second, high pressure reset spring means, positioned between said first and second spring support members, for selectively acting on said piston for moving said piston, and thereby said valve, in said first direction, thus providing a high pressure resistance to movement of said piston in a second direction toward said second end of said head;

means for selectively removing the action of said second spring means on said piston, thus providing a low pressure resistance to movement of said piston in said second direction, and removing means comprising a selecting cap mounted on said head for selective rotation with respect thereto, at least one axially inclined surface formed on said cap, and at least one lug extending from said first spring support member and abutting said inclined surface, such that rotation of said cap causes movement of said first spring support member from said first position thereof to said second position thereof; and said head having therein a control opening for the selective supply of a control pressure medium for moving said piston in said second direction against the force of said first or second spring means.

4. The improvement claimed in claim 3, further comprising optical indicator means, connected to said rod, for providing a visual indication of whether said second spring means is acting on said piston.

* * * * *